Oct. 6, 1936.  S. P. TSCHAPPAT  2,056,543
TUBING HEAD
Filed Feb. 7, 1935  3 Sheets-Sheet 1

Inventor
Sheridan P. Tschappat
By Jack Ashley
Attorney

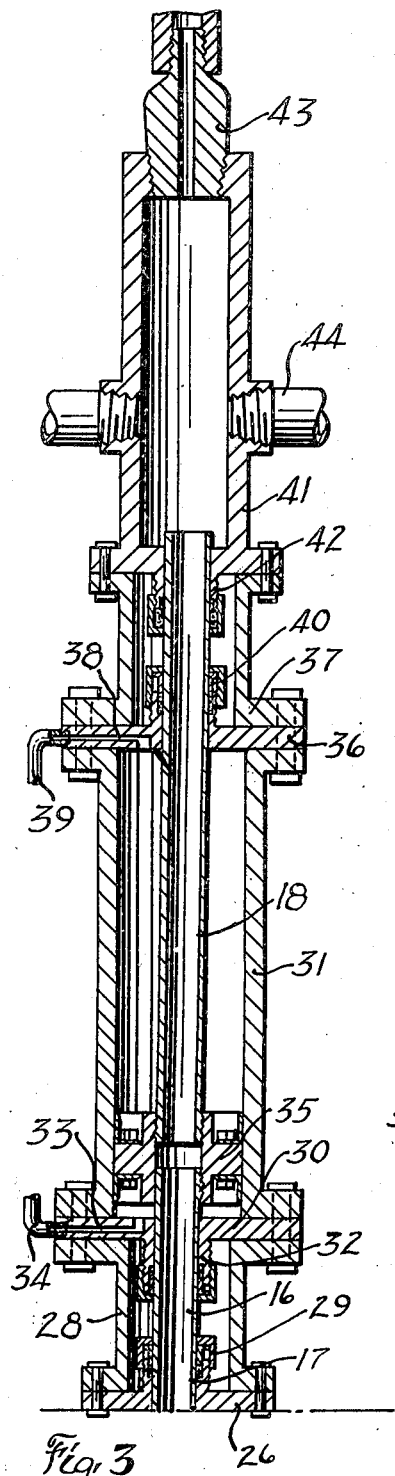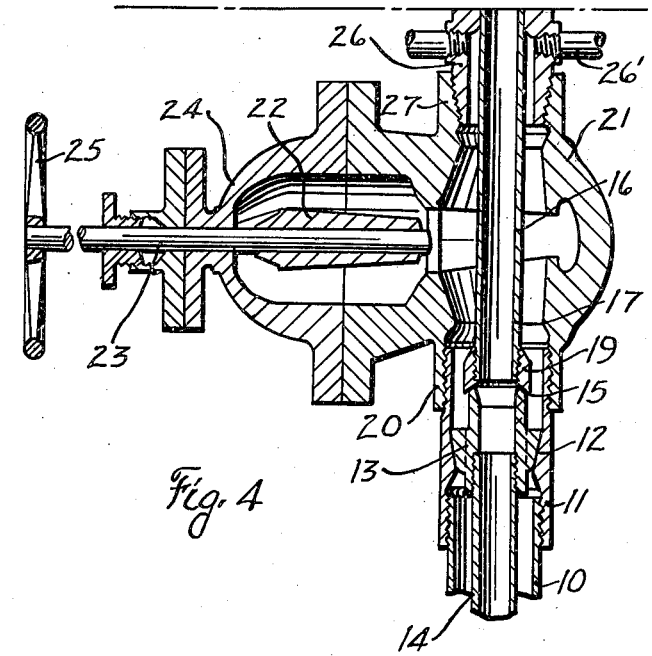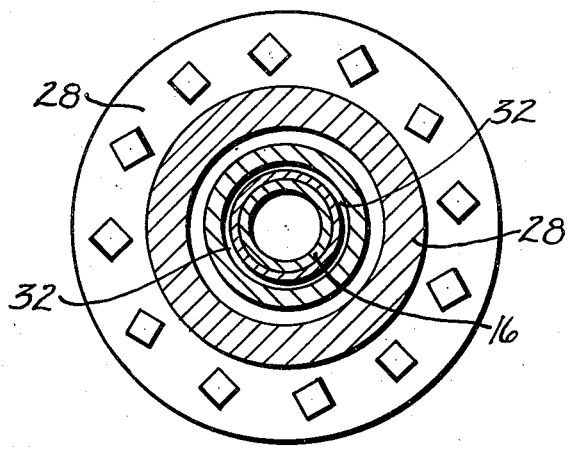

Oct. 6, 1936.  S. P. TSCHAPPAT  2,056,543
TUBING HEAD
Filed Feb. 7, 1935  3 Sheets-Sheet 3

Inventor
Sheridan P. Tschappat
By
Attorney

Patented Oct. 6, 1936

2,056,543

UNITED STATES PATENT OFFICE 2,056,543

TUBING HEAD

Sheridan P. Tschappat, Tulsa, Okla.

Application February 7, 1935, Serial No. 5,367

1 Claim. (Cl. 166—15)

This invention relates to new and useful improvements in tubing heads.

One object of the invention is to produce an improved safety tubing head providing for a continuous string of tubing when the master gate valve is open, and arranged for quickly parting the tubing and the closing of the gate valve when necessary to do so.

A particular object of the invention is to provide a tubing head having fluid actuated means for moving the upper tubing section up and down, whereby the tubing may be quickly united or separated; and the tubing operation controlled from any desirable distance and accomplished by a single rapid operation, thereby making for quicker closing of the gate valve.

A further object of the invention is to provide a safety tubing head having means for parting and uniting the tubing, constructed in a simple and sturdy manner and eliminating the use of screws and gears and other complicated parts, as well as providing for holding the tubing connection under pressure, whereby a more effective connection and seal are produced.

A construction designed to carry out the invention will be hereinafter described, together with other features of the invention.

Figure 1:
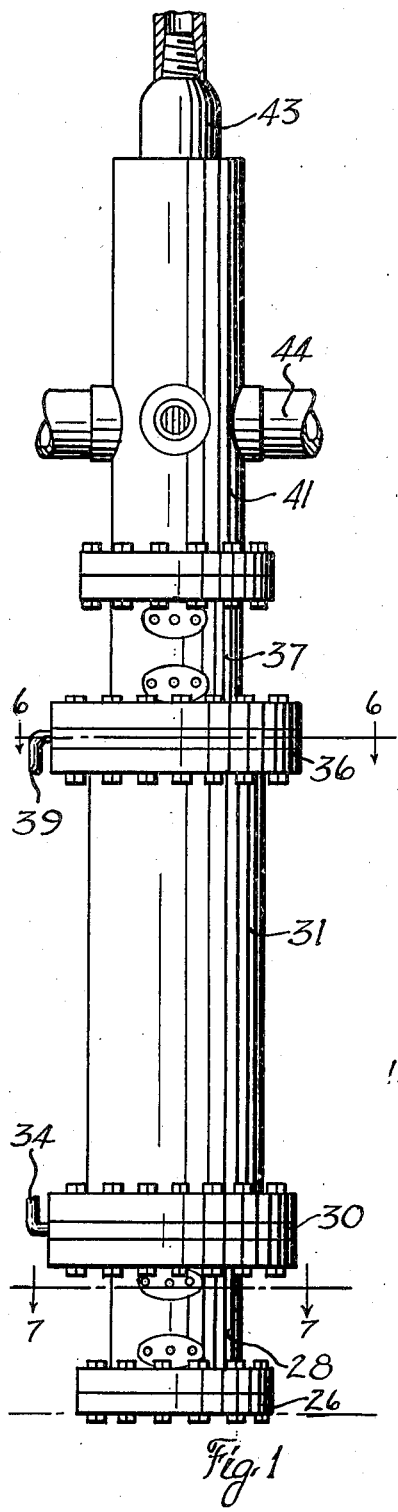
Figure 2:
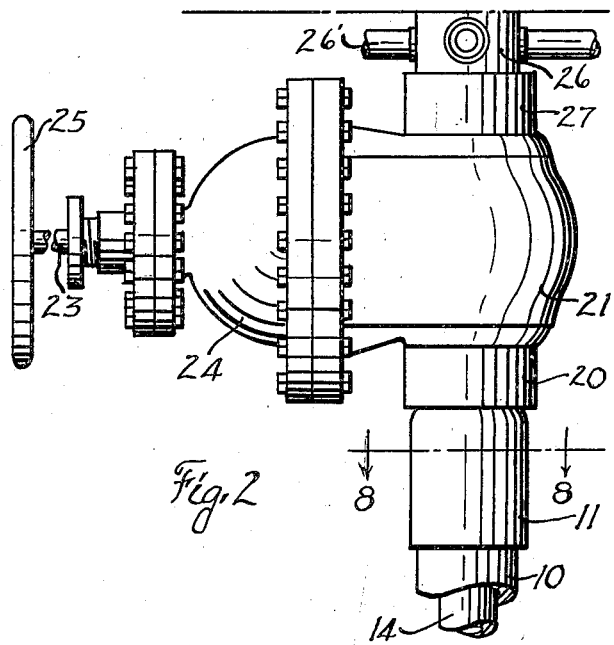
Figure 8:
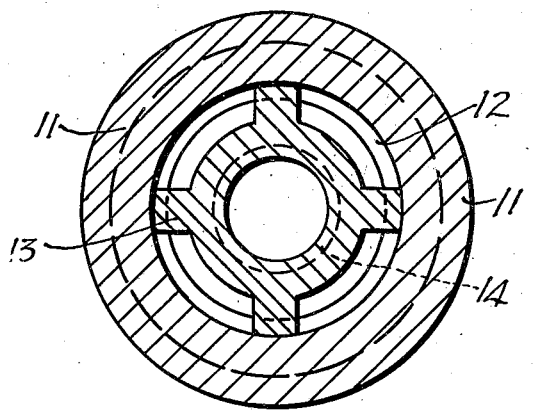
Figure 6:
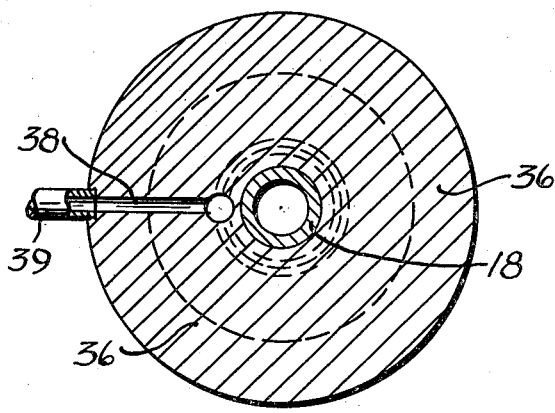
Figure 5:
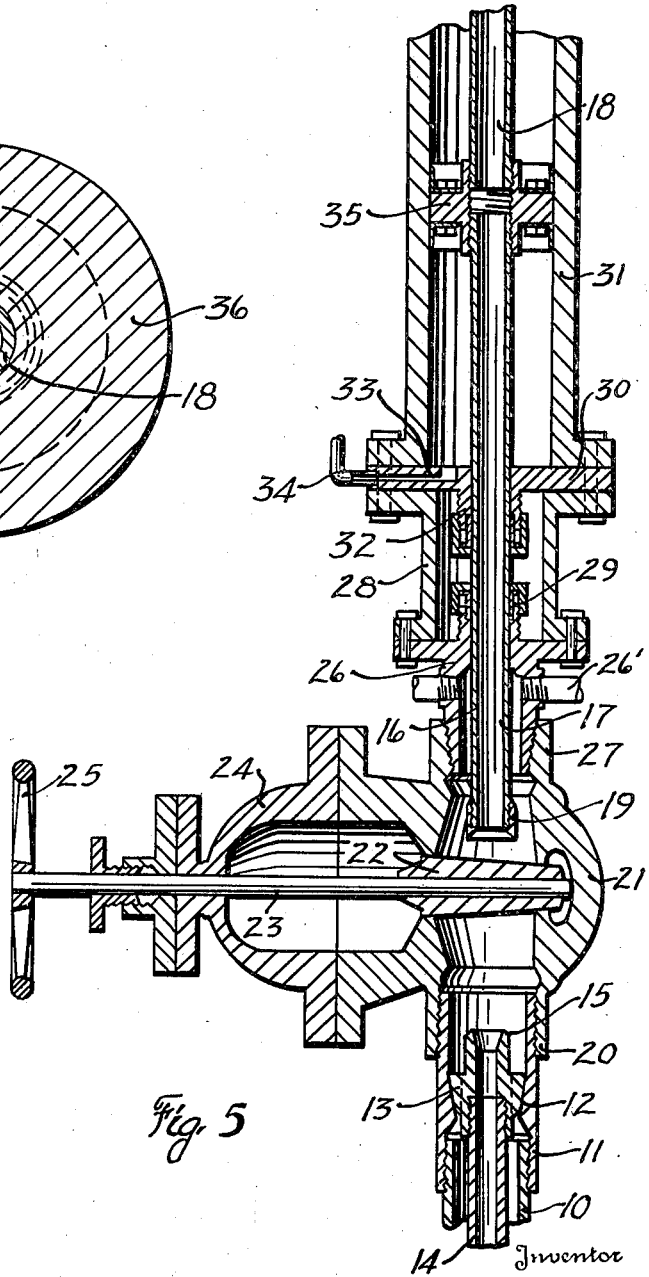

The invention will be more readily understood from a reading of the following specification and by reference to the accompanying drawings, in which an example of the invention is shown, and wherein:

Figure 1 is an elevation of the upper portion of a safety tubing head constructed in accordance with the invention, Figure 2 is an elevation of the lower portion of the same, Figure 3 is a vertical sectional view of the portion shown in Figure 1, Figure 4 is a vertical sectional view of the portion shown in Figure 2, Figure 5 is a vertical sectional view showing the tubing retracted and the gate valve closed, Figure 6 is an enlarged horizontal cross-sectional view taken on the line 6—6 of Figure 1, Figure 7 is an enlarged horizontal cross-sectional view taken on the line 7—7 of Figure 1, and Figure 8 is an enlarged horizontal cross-sectional view taken on the line 8—8 of Figure 2.

In the drawings the numeral 10 designates a well casing on which a tubing hanger 11 is mounted. The hanger has a bowl 12 adapted to support the tubing mandrel 13 in the usual manner. The lower string of tubing 14 is screwed into the bottom of the mandrel. The mandrel has its upper end beveled downwardly and outwardly and ground to form a seat 15.

The upper string of tubing 16 is preferably formed of a lower piston stem 17 and an upper piston stem 18. The lower stem 17 carries a shoe 19 on its lower end beveled and ground complementary to the seat 15 to engage said seat and form a fluid-tight joint therewith. The tubing hanger 11 extends above the seat 15, so that seating of the stem 17 takes place within said hanger.

The upper end of the hanger screws into the lower collar 20 of a master gate valve case 21. This valve may be of any suitable construction and includes a gate 22 having a stem 23 extending through the bonnet 24 and receiving the usual hand wheel 25. Normally the gate is withdrawn or open as is shown in Figure 4, but when the stem 17 is retracted or elevated, as is shown in Figure 5, the gate may be closed by revolving the hand wheel 25.

A lower cross-head 26 is screwed into the upper collar 27 of the valve case and is flanged so that a flanged cylindrical yoke 28 may be bolted thereto. A stuffing box 29 mounted on top of the cross-head 26 extends upward into the yoke and snugly embraces the stem 17, thus packing off the cross-head so that fluids entering the head may be conducted therefrom in the usual manner by the pipes 26'.

The lower cap 30 of a fluid pressure cylinder 31 is bolted on top of the yoke and has a stuffing box 32 depending therefrom into the yoke and snugly surrounding the piston stem 17. The cap has a duct 33 extending from the cylinder to its outer edge and receives a pressure fluid pipe 34. A piston 35 slidable in the cylinder 31 has the ends of the stems 17 and 18 screwed thereinto, so that the fluids flowing up the string 14 into the stem 17 may pass through the piston to the stem 18. The stuffing box 32 packs-off the cylinder from the yoke.

The cylinder has a cap 36 at its upper end bolted thereto with the lower flange of a cylindrical upper yoke 37. The upper cap 36 has a duct 38 similar to the duct 33 and connected with a pressure fluid pipe 39. A stuffing box 40 mounted on the cap 36 surrounds the upper stem 18 and extends into the yoke 37. An upper cross-head 41 is bolted on the yoke and has a stuffing box 42 depending into the yoke and snugly embracing the upper stem 18. This upper cross-head is high enough to permit the piston stem 18 to reciprocate freely therein. A sub-nipple 43 is screwed into the top of the cross-head 41 and the head receives discharge pipes 44.

When the parts are in the position shown in Figures 3 and 4, the oil or other fluid may pass up the tubing strings 14 and 16 and discharge into the upper cross-head 41 from which it is conducted by the pipes 44. Gas or other fluid flowing outside the strings cannot pass the stuffing box 29 and is carried off from the lower cross-head 26 by the pipes 26'. Pressure fluid, such as steam, air, water or gas under pressure supplied to the upper end of the cylinder by the pipe 39 exerts a downward pressure on the piston 35, thus holding the shoe 19 on the seat 15, thereby not only assuring a proper connection between the tubing strings, but assuring a fluid-tight seal therebetween.

When it is desired to retract the upper string 16 to separate the tubing, so that the gate 22 may be closed, it is merely necessary to shift the pressure fluid supply so that said fluid flows from the pipe 34 through the duct 33 to the bottom of the cylinder 30 below the piston 35, the duct 38 and pipe 39 becoming an exhaust conductor. Just as soon as the pressure fluid enters the bottom of the cylinder 31, the piston 35 will be quickly moved to the upper end of said cylinder. Thus the upper string will be retracted quickly and at a single operation. It is obvious that such an operation may be performed much more quickly than where it is necessary to manipulate a hand wheel or operate a screw. The control for the pressure fluid may be close to the device or it may be remote therefrom, permitting actuation at a safe distance from the well.

The hand wheel 25 of the gate valve may be operated in the usual manner. It is pointed out that the retraction of the stem 17 may be almost instantaneous, and therefore the gate valve may be closed with a minimum effort and without loss of time. The stuffing boxes 29, 32, 40 and 42 adequately pack-off the string 16 and yet permit free and quick sliding of said stem. These boxes are easily reached by unbolting the yokes 28 and 37.

When it is desired to open the gate valve 22, it is merely necessary to turn the hand wheel 25 to withdraw said gate and then to reverse the flow of the pressure fluid. This will move the piston 35 downwardly, whereby the string 16 will be lowered until the shoe 19 engages the seat 15. The structure is simple and sturdy and affords a substantial and convenient support for the usual well fittings. Because of the short length of the tubing string 16, the device may be operated under a low pressure.

What I claim and desire to secure by Letters Patent, is:

A safety tubing head including, a hanger having a tubing seat, a gate valve above the hanger, a lower cross-head supported on the valve, an elongate fluid pressure cylinder mounted on the cross-head, a piston slidable in the cylinder, a cap closing the lower end of the piston, a cap closing the upper end of the piston, an upper cross-head mounted on the cylinder, a tubing string connected to said piston and extending through the cylinder, caps, cross-heads and valve and engaging the hanger seat, the upper end of said string terminating at the upper cross-head when the string is seated, a stuffing box surrounding the tubing and carried by each cap, a stuffing box also surrounding the tubing and carried by each cross-head, and an outlet immediately above the upper cross-head, whereby fluid passing upwardly through the tubing may escape through the outlet, the tubing being free from connection with any of the parts through which it extends, whereby when fluid pressure is applied to the underside of the piston, the tubing string is raised from its seat.

SHERIDAN P. TSCHAPPAT.